United States Patent
Itou et al.

(10) Patent No.: US 8,860,280 B2
(45) Date of Patent: Oct. 14, 2014

(54) ROTOR FOR ELECTRIC ROTATING MACHINE AND METHOD OF MANUFACTURING THE SAME

(75) Inventors: Yuuichirou Itou, Kariya (JP); Masahiro Seguchi, Obu (JP); Yuki Takahashi, Obu (JP); Hideaki Suzuki, Chiryu (JP)

(73) Assignee: Denso Corporation, Kariya (JP)

( * ) Notice: Subject to any disclaimer, the term of this patent is extended or adjusted under 35 U.S.C. 154(b) by 52 days.

(21) Appl. No.: 13/435,137

(22) Filed: Mar. 30, 2012

(65) Prior Publication Data

US 2012/0248918 A1 Oct. 4, 2012

(30) Foreign Application Priority Data

Apr. 1, 2011 (JP) ................. 2011-081465

(51) Int. Cl.
*H02K 1/28* (2006.01)
*H02K 1/30* (2006.01)
*H02K 1/22* (2006.01)
*H02K 1/24* (2006.01)
*H02K 1/27* (2006.01)

(52) U.S. Cl.
CPC ............... *H02K 1/22* (2013.01); *H02K 1/246* (2013.01); *H02K 1/276* (2013.01)
USPC ...... 310/216.049; 310/216.051; 310/216.059; 310/216.058; 29/598

(58) Field of Classification Search
CPC .......... H02K 1/28; H02K 1/30; H02K 1/276; H02K 1/2766; H02K 15/03
USPC ................. 310/156.048, 216.016, 216.058, 310/216.049, 216.059, 261.1
See application file for complete search history.

(56) References Cited

U.S. PATENT DOCUMENTS 7,057,322 B2   6/2006  Araki et al.
7,737,592 B2 *  6/2010  Makino et al. ........... 310/156.09

(Continued)

FOREIGN PATENT DOCUMENTS

JP      A-S55-162839     12/1980
JP      UM-A-S59-013053   1/1984

(Continued)

OTHER PUBLICATIONS

Office Action (2 pgs.) dated Apr. 16, 2013 issued in corresponding Japanese Application No. 2011-081465 with an at least partial English-language translation thereof (3 pgs.).

(Continued)

*Primary Examiner* — Terrance Kenerly
(74) *Attorney, Agent, or Firm* — Nixon & Vanderhye, P.C.

(57) ABSTRACT

A rotor includes a rotor core comprised of steel sheets that are laminated in the axial direction of the rotor core and a rotating component configured to rotate together with the rotor core. Each of the steel sheets has a positioning portion for circumferentially positioning the steel sheet with respect to the rotating component and is formed of a rolled steel material. For each of the steel sheets, the direction of rolling of the steel sheet is circumferentially offset from both imaginary lines X and Y by predetermined angles. Each of the steel sheets is shaped so that the circumferential position of the positioning portion thereof remains unchanged when the steel sheet is front-back inverted about the imaginary line X. When viewed along the axial direction, at least one of the steel sheets is front-back inverted with respect to and thus forms a mirror image of the other steel sheets.

9 Claims, 10 Drawing Sheets

(56) References Cited

U.S. PATENT DOCUMENTS

| | | |
|---|---|---|
| 7,923,878 B2 * | 4/2011 | Awazu et al. ............ 310/156.32 |
| 7,948,133 B2 * | 5/2011 | Fu ............................ 310/156.09 |
| 2002/0050749 A1 * | 5/2002 | Higuchi ...................... 310/67 R |
| 2005/0052089 A1 * | 3/2005 | Horng et al. .................... 310/90 |
| 2005/0104468 A1 | 5/2005 | Araki et al. |
| 2006/0163967 A1 * | 7/2006 | Yamamoto et al. ........... 310/216 |
| 2007/0273238 A1 * | 11/2007 | Nomura et al. ............... 310/217 |
| 2009/0284095 A1 * | 11/2009 | Horng et al. ............. 310/156.59 |
| 2011/0084575 A1 * | 4/2011 | Kim .............................. 310/425 |

FOREIGN PATENT DOCUMENTS

| | | |
|---|---|---|
| JP | 2005-51897 | 2/2005 |
| JP | 4070674 | 1/2008 |
| JP | 2009-33908 | 2/2009 |

OTHER PUBLICATIONS

Notification of Reasons for Rejection issued in corresponding Japanese Patent Application No. 2011-081465 on Oct. 22, 2013 with English-language translation.

* cited by examiner

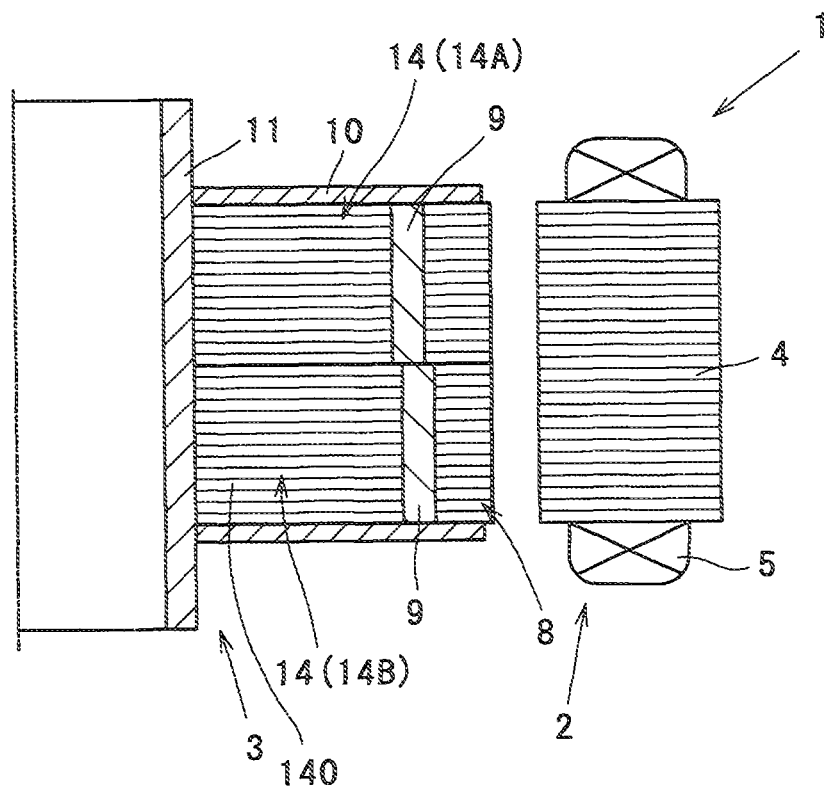

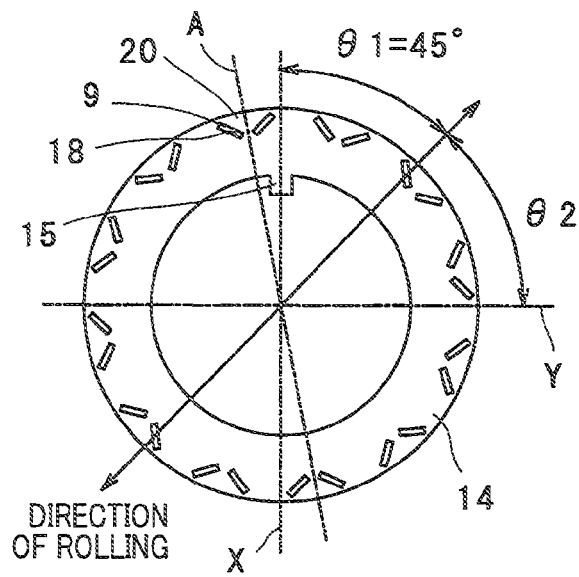
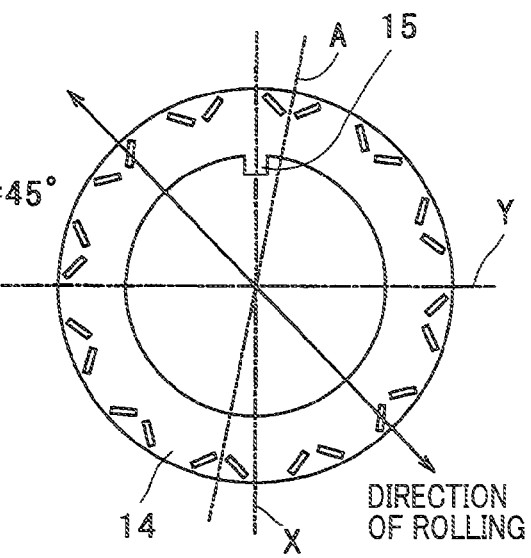
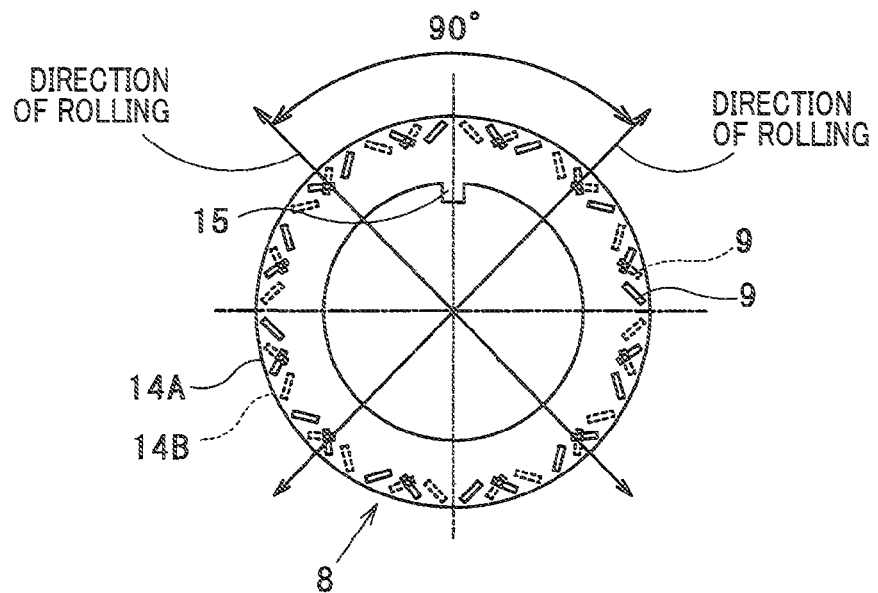

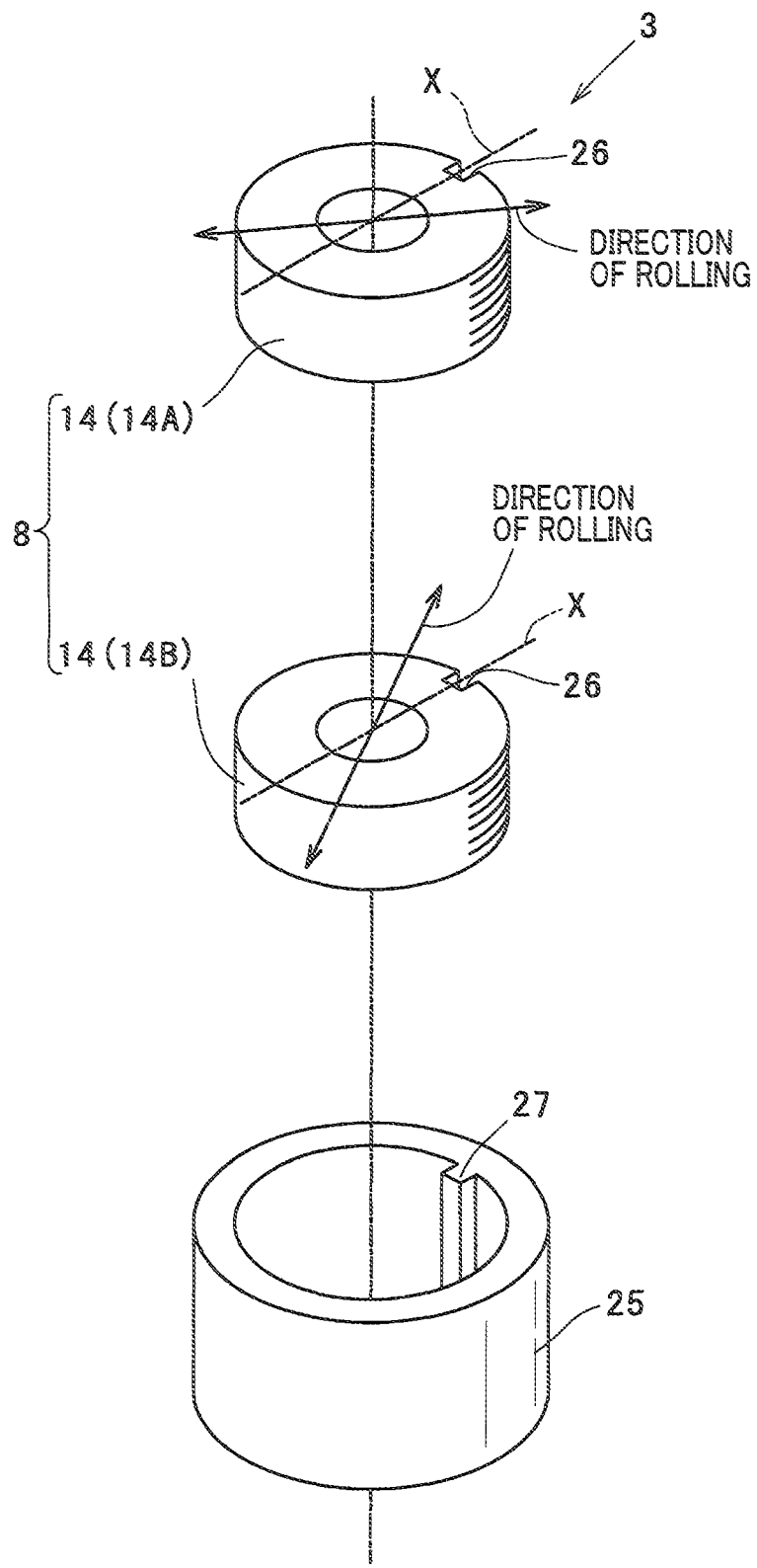

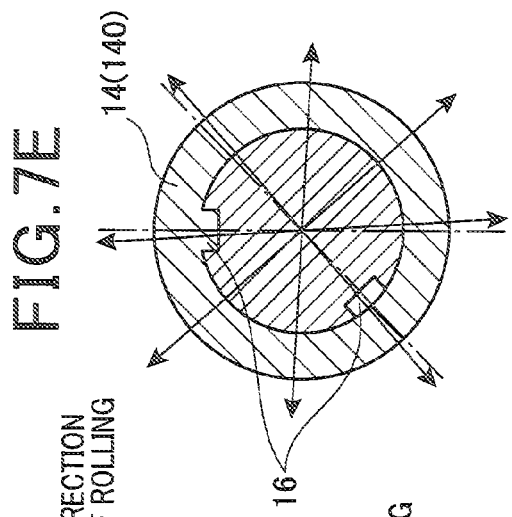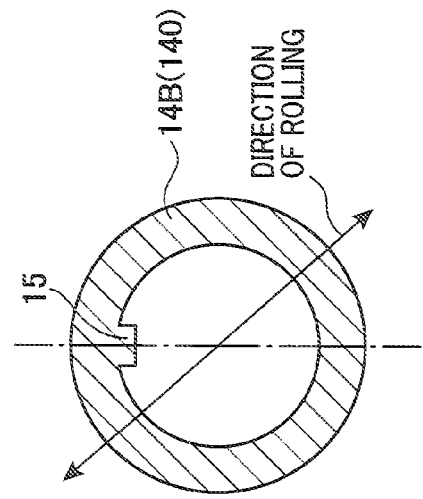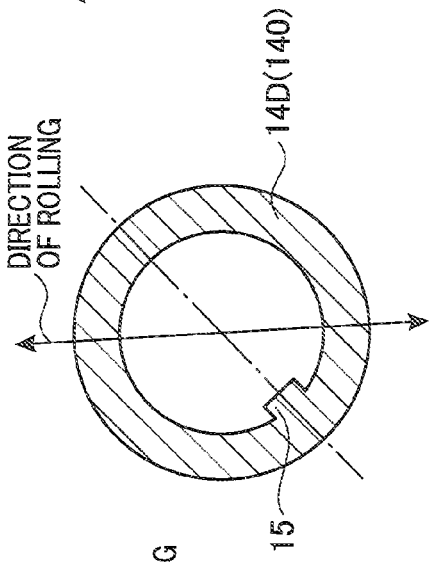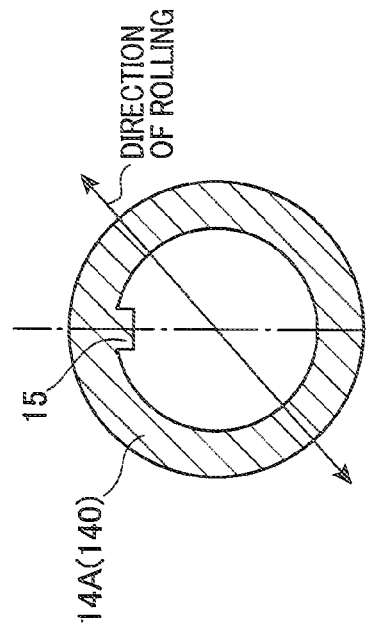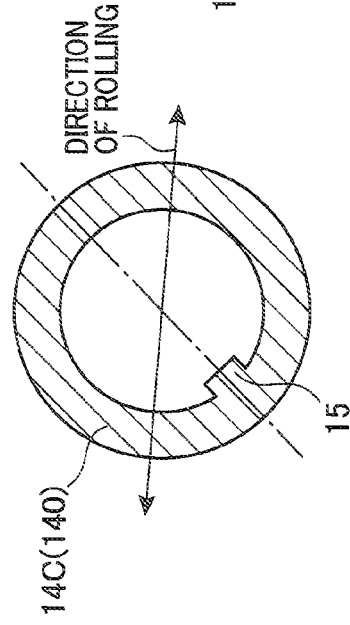

ROTOR FOR ELECTRIC ROTATING MACHINE AND METHOD OF MANUFACTURING THE SAME

CROSS-REFERENCE TO RELATED APPLICATION

This application is based on and claims priority from Japanese Patent Application No. 2011-81465, filed on Apr. 1, 2011, the content of which is hereby incorporated by reference in its entirety into this application.

BACKGROUND

1. Technical Field

The present invention relates to rotors for electric rotating machines that are used in, for example, motor vehicles as electric motors and electric generators, and to methods of manufacturing the rotors. In addition, the invention can also be applied to industrial machines and household electrical appliances.

2. Description of Related Art

There are known rotors for electric rotating machines which include a rotor core formed by stacking a plurality of steel sheet blocks and a rotating component (or rotating object) configured to rotate together with the rotor core.

Here, when the electric rotating machine is of an inner rotor type, the rotating component represents a rotating shaft that is disposed radially inside of the rotor core so as to extend in the axial direction of the rotor core; otherwise, when the electric rotating machine is of an outer rotor type, the rotating component represents a rotating drum that is fitted on the radially outer periphery of the rotor core. In addition, each of the steel sheet blocks is obtained by laminating a plurality of magnetic steel sheets.

Further, each of the steel sheet blocks has a positioning portion for positioning the rotor core with respect to the rotating component in the circumferential direction of the rotor core.

For example, as shown in FIGS. 10A and 10B, each of the steel sheet blocks 101 may have a key 103 as the positioning portion. More specifically, the key 103 is formed so as to protrude radially inward from the inner circumferential surface (or the radially inner surface) of the steel sheet block 101 which has an annular shape. The key 103 is fitted into a keyway 105 formed in the radially outer surface of the rotating shaft 102 (i.e., the rotating component), thereby positioning the steel sheet block 101 with respect to the rotating shaft 102 in the circumferential direction.

Furthermore, the magnetic steel sheets, of which the steel sheet blocks 101 are formed, are generally shaped by punching a rolled magnetic steel sheet. In this case, the magnetic characteristics of each of the steel sheet blocks 101 vary in the circumferential direction depending on the direction of rolling of the magnetic steel sheets that make up the steel sheet block 101, thereby causing magnetic imbalance in the rotor core.

Moreover, there is also known a technique for reducing the magnetic imbalance in the rotor core. According to the technique, the steel sheet blocks 101 are first rotated by a predetermined angle with respect to each other and then stacked together. Consequently, when viewed along the axial direction of the resultant rotor core, the directions of rolling of the magnetic steel sheets that make up the steel sheet blocks 101 intersect each other.

With the above technique, it is possible to reduce the magnetic imbalance in the rotor core without employing more than one type of the magnetic steel sheets. However, at the same time, the above technique also involves the following problem.

For each of the steel sheet blocks 101, the direction of rolling of the magnetic steel sheets that make up the steel sheet block 101 is represented by an imaginary line X that extends straight, on a plane parallel to the steel sheet block 101, through the center of rotation of the rotor core so as to circumferentially bisect the key 103 of the steel sheet block 101. Therefore, when the steel sheet blocks 101 are rotated with respect to each other so as to make the directions of rolling of the magnetic steel sheets that make up the steel sheet blocks 101 circumferentially offset from each other, the circumferential positions of the keys 103 of the steel sheet blocks 101 accordingly become different from each other. Consequently, it is necessary to form, in the radially outer surface of the rotating shaft 102, a plurality of keyways 105 that are circumferentially offset from each other as shown in FIG. 10B.

On the other hand, Japanese Patent No. 4070674 discloses a technique for achieving a skewed rotor structure by employing only a single type of steel sheets. More specifically, according to the technique, a rotor core is comprised of a plurality of identical steel sheets; the steel sheets are laminated with part of the steel sheets front-back inverted with respect to and thus being a mirror image of the other steel sheets. However, this patent document fails to disclose or even suggest how to reduce magnetic imbalance that is caused in the rotor core depending on the directions of rolling of the steel sheets.

SUMMARY

According to an exemplary embodiment, a rotor for an electric rotating machine is provided which includes a rotor core and a rotating component. The rotor core is comprised of a plurality of substantially annular steel sheets that are laminated in the axial direction of the rotor core. The rotating component is configured to rotate together with the rotor core. Each of the steel sheets has a positioning portion for positioning the steel sheet with respect to the rotating component in the circumferential direction of the rotor core. Each of the steel sheets is formed of a rolled steel material and thus has a direction of rolling thereof. For each of the steel sheets, the direction of rolling of the steel sheet is circumferentially offset from both an imaginary line X and an imaginary line Y by predetermined angles. The imaginary line X is defined to extend straight, on a plane parallel to the steel sheet, through the center of rotation of the rotor core so as to circumferentially bisect the positioning portion of the steel sheet. The imaginary line Y is defined to extend straight, on the same plane as the imaginary line X, perpendicular to the imaginary line X. Each of the steel sheets is shaped so that the circumferential position of the positioning portion of the steel sheet remains unchanged when the steel sheet is front-back inverted about the imaginary line X. When viewed along the axial direction of the rotor core, at least one of the steel sheets is front-back inverted with respect to and thus forms a mirror image of the other steel sheets.

With the above configuration, all the positioning portions of the steel sheets are located at the same circumferential position. Moreover, the direction of rolling of the at least one of the steel sheets is circumferentially offset from that of the other steel sheets. Consequently, when viewed along the axial direction of the rotor core, the direction of rolling of the at least one of the steel sheets intersects that of the other steel sheets. As a result, it becomes possible to reduce magnetic imbalance in the rotor core without employing more than one type of the steel sheets and without rotating the steel sheets with respect to each other.

It is preferable that for each of the steel sheets, both the predetermined angle between the direction of rolling of the steel sheet and the imaginary line X and the predetermined angle between the direction of rolling of the steel sheet and the imaginary line Y are equal to 45°.

It is also preferable that for each of the steel sheets, the positioning portion of the steel sheet is formed at a single position in the circumferential direction of the rotor core.

In a further implementation, for each of the steel sheets, the positioning portion of the steel sheet is in a radial protrusion-recess engagement with the rotating component. By the radial protrusion-recess engagement between the positioning portion and the rotating component, the steel sheet is circumferentially positioned and stopped from rotating with respect to the rotating component.

The rotor has a plurality of magnetic poles formed on a periphery of the rotor core. For each of the magnetic poles, a centerline A of the magnetic pole is preferably circumferentially offset from both the imaginary lines X and Y defined for the steel sheets. The centerline A is defined to extend straight, on the same plane as the imaginary lines X and Y, so as to circumferentially bisect the magnetic pole. All the magnetic poles are preferably asymmetrically arranged with respect to the imaginary line X.

Further, the magnetic poles of the rotor may be formed of permanent magnets fixed to the rotor core. In this case, it is preferable that: the circumferential positions of the permanent magnets located at the at least one of the steel sheets are different from those located at the other steel sheets; and the permanent magnets located at the at least one of the steel sheets are out of axial alignment with those located at the other steel sheets.

Each of the magnetic steel sheets may be shaped by pressing the rolled steel material.

According to the exemplary embodiment, there is also provided a method of manufacturing a rotor for an electric rotating machine. The method includes the steps of: (1) preparing a plurality of substantially annular steel sheets and a rotating component, each of the steel sheets having a positioning portion for circumferentially positioning the steel sheet with respect to the rotating component; (2) laminating the steel sheets to form a rotor core; and (3) assembling the rotor core and the rotating component so that each of the steel sheets is circumferential positioned with respect to the rotating component by the positioning portion thereof. In the preparing step, each of the steel sheets is formed by punching a rolled steel material so that in the resultant steel sheet, the direction of rolling of the steel sheet is circumferentially offset from both an imaginary line X and an imaginary line Y by predetermined angles. The imaginary line X is defined to extend straight, on a plane parallel to the steel sheet, through the center of rotation of the rotor core so as to circumferentially bisect the positioning portion of the steel sheet. The imaginary line Y is defined to extend straight, on the same plane as the imaginary line X, perpendicular to the imaginary line Y. In the laminating step, the steel sheets are laminated with at least one of the steel sheets front-back inverted with respect to and thus being a mirror image of the other steel sheets.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 1 is a schematic cross-sectional view illustrating the overall configuration of an electric rotating machine which includes a rotor according to a first embodiment;

FIG. 2A is a front end view of a steel sheet block for forming a rotor core of the rotor;

FIG. 2B is a rear end view of the steel sheet block;

FIG. 2C is a schematic axial end view of the rotor core in which two steel sheet blocks are axially stacked with one of the steel sheet blocks front-back inverted with respect to and thus being a mirror image of the other steel sheet block;

FIG. 6 is an exploded perspective view of a rotor according to a second embodiment;

FIG. 7A is a cross-sectional view of a first steel sheet block for forming a rotor core according to a third embodiment;

FIG. 7B is a cross-sectional view of a second steel sheet block for forming the rotor core according to the third embodiment;

FIG. 7C is a cross-sectional view of a third steel sheet block for forming the rotor core according to the third embodiment;

FIG. 7D is a cross-sectional view of a fourth steel sheet block for forming the rotor core according to the third embodiment;

FIG. 7E is a cross-sectional view of the rotor core according to the third embodiment;

DESCRIPTION OF EMBODIMENTS

Figure 3A:
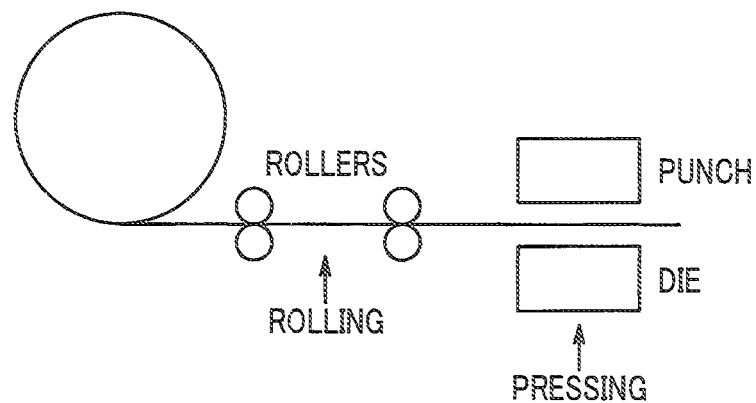
FIG. 3A is a schematic side view illustrating both a process of rolling a magnetic steel material to form a rolled magnetic steel sheet and a process of pressing the rolled magnetic steel sheet to form magnetic steel sheets that make up the steel sheet blocks.

Exemplary embodiments will be described hereinafter with reference to FIGS. 1-9. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

FIG. 1 shows the overall configuration of an electric rotating machine 1 which includes a rotor 3 according to a first embodiment.

In this embodiment, the electric rotating machine 1 is configured as a motor generator that can function both as an electric motor and as an electric generator in, for example, a hybrid or electric vehicle.

As shown in FIG. 1, the electric rotating machine 1 includes a hollow cylindrical stator 2 and the rotor 3 that is rotatably disposed radially inside of the stator 2. That is to say, in the present embodiment, the electric rotating machine 1 is of an inner rotor type.

The stator 2 includes a stator core 4 and a three-phase stator coil 5. The stator core 4 is formed, by laminating a plurality of magnetic steel sheets, into a hollow cylindrical shape. The stator coil 5 is mounted on the stator core 4.

When the electric rotating machine 1 operates as an electric motor, the stator 2 creates, upon supply of three-phase alternating current to the stator coil 5, a rotating magnetic field which causes the rotor 3 to rotate. On the other hand, when the electric rotating machine 1 operates as an electric generator, the rotor 3 is driven by, for example, an internal combustion engine of the vehicle to rotate, thereby inducing three-phase alternating current in the stator coil 5.

The rotor 3 is disposed concentrically with and radially inside of the stator 2. The rotor 3 includes a rotor core 8, a plurality of permanent magnets 9 embedded in the rotor core 8, a pair of end plates 10, and a rotating shaft 11. That is to say, in the present embodiment, the rotor 3 is configured as an Interior Permanent Magnet (IPM) rotor.

The rotor core 8 is cylindrical-shaped and comprised of a plurality of magnetic steel sheets 140 that are laminated in the axial direction of the rotor core 8. More specifically, the rotor core 8 is formed by stacking a plurality (e.g., two in the present embodiment) of steel sheet blocks 14 in the axial direction; each of the steel sheet blocks 14 is formed by laminating a predetermined number of the magnetic steel sheets 140 in the axial direction.

The permanent magnets 9 are embedded in the rotor core 8 so as to form a plurality of magnetic poles on the radially outer periphery of the rotor core 8. The magnetic poles are arranged in the circumferential direction of the rotor core 8 at predetermined intervals so that the polarities of the magnetic poles alternate between north and south in the circumferential direction.

The end plates 10 are respectively provided on opposite axial end faces of the rotor core 8 so as to together sandwich the rotor core 8 in the axial direction.

In addition, each of the rotor core 8 and the end plates 10 has a through-hole formed at the radial center thereof. The rotating shaft 11 is fitted in the through-holes of the rotor core 8 and the end plates 10 so as to extend in the axial direction of the rotor core 8 and rotate together with the rotor core 8.

Next, the outstanding features of the rotor 3 according to the present embodiment will be described with reference to FIGS. 2A-5.

In the present embodiment, each of the steel sheet blocks 14 has a substantially annular shape and includes a key 15 as a positioning portion for positioning the steel sheet block 14 with respect to the rotating shaft 11 in the circumferential direction of the rotor core 8. As shown in FIGS. 2A-2C and 4, the key 15 is formed in the steel sheet block 14 so as to protrude radially inward from the inner circumferential surface (or the radially inner surface) of the steel sheet block 14 and extend in the axial direction of the steel sheet block 14 (or the axial direction of the rotor core 8).

Figure 4:
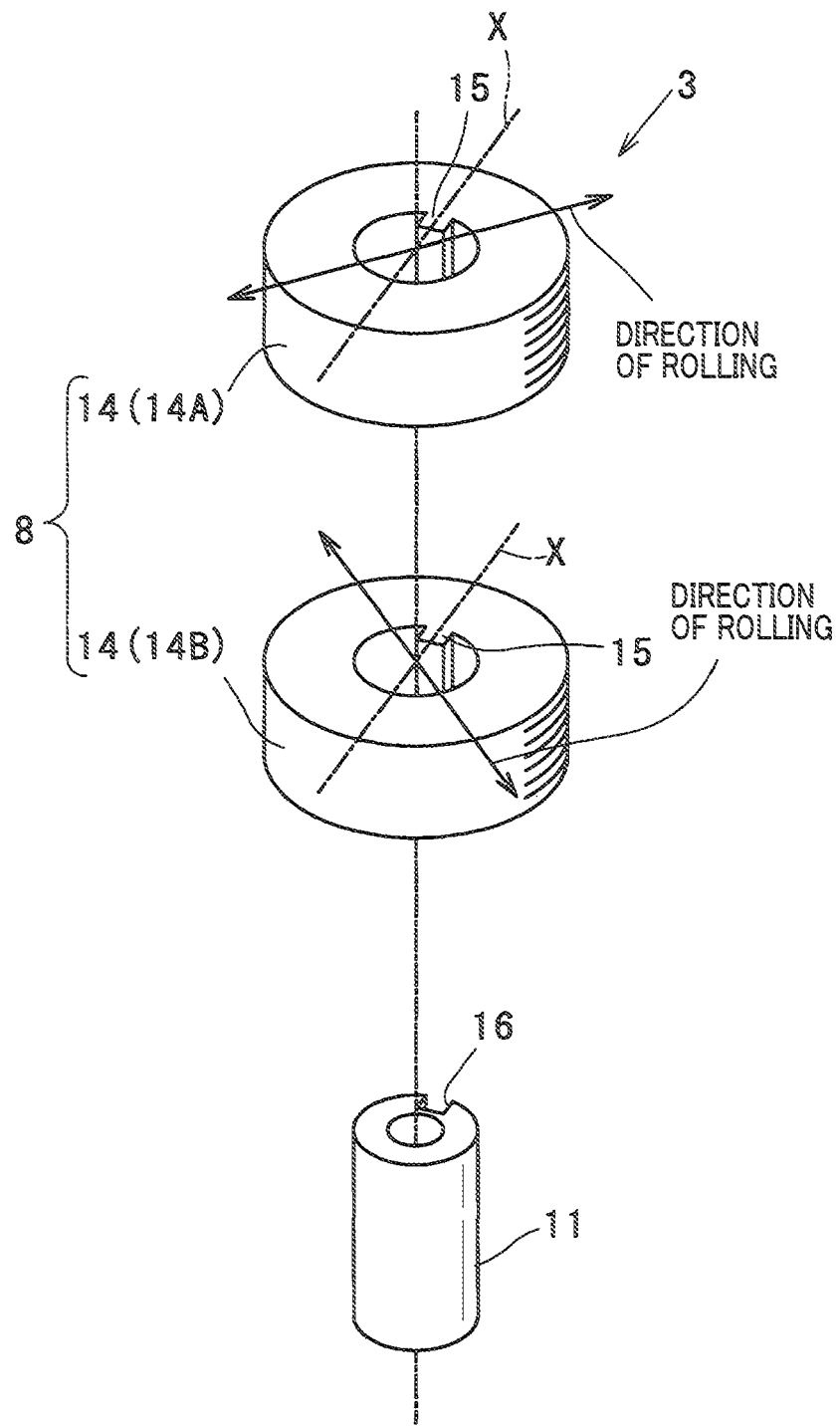
FIG. 4 is an exploded perspective view of the rotor.

On the other hand, as shown in FIG. 4, the rotating shaft 11 has a keyway 16 that is formed in the radially outer surface of the rotating shaft 11 so as to extend in the axial direction of the rotating shaft 11.

The keys 15 of the steel sheet blocks 14 are fitted in the keyway 16 of the rotating shaft 11, thereby positioning the steel sheet blocks 14 with respect to the rotating shaft 11 in the circumferential direction and stopping relative rotation between the steel sheet blocks 14 and the rotating shaft 11.

In other words, in the present embodiment, the positioning portions (i.e., the keys 15) of the steel sheet blocks 14 are in a radial protrusion-recess engagement with the rotating shaft 11; with the radial protrusion-recess engagement, the steel sheet blocks 14 are circumferentially positioned and stopped from rotating with respect to the rotating shaft 11.

Further, for each of the steel sheet blocks 14, the circumferential position of the key 15 of the steel sheet block 14 remains unchanged when the steel sheet block 14 is front-back inverted about an imaginary line X. Here, the imaginary line X is defined to extend straight, on a plane parallel to the steel sheet block 14, through the radial center of the steel sheet block 14 (or the center of rotation of the rotor core 8) so as to circumferentially bisect the key 15 of the steel sheet block 14.

In the present embodiment, each of the steel sheet blocks 14 has only the single key 15 formed at a predetermined circumferential position. The rotating shaft 11 has only the single keyway 16 formed at a predetermined circumferential position corresponding to the circumferential positions of the keys 15 of the steel sheet blocks 14. In addition, the keys 15 of the steel sheet blocks 14 are fitted in the keyway 16 of the rotating shaft 11 at a dimensional tolerance less than or equal to a predetermined value so that no backlash occurs between the keys 15 and the keyway 16.

Furthermore, in the present embodiment, for each of the magnetic steel sheets 140 of the steel sheet blocks 14, the direction of rolling of the magnetic steel sheet 140 is circumferentially offset from both the imaginary line X and an imaginary line Y by a mechanical angle of 45°. Here, the imaginary line Y is defined to extend straight, on the same plane as the imaginary line X, perpendicular to the imaginary line X. Consequently, as shown in FIG. 2A, both the angle $\theta 1$ between the direction of rolling of the magnetic steel sheet 140 and the imaginary line X and the angle $\theta 2$ between the direction of rolling of the magnetic steel sheet 140 and the imaginary line Y are equal to 45°.

Figure 3B:
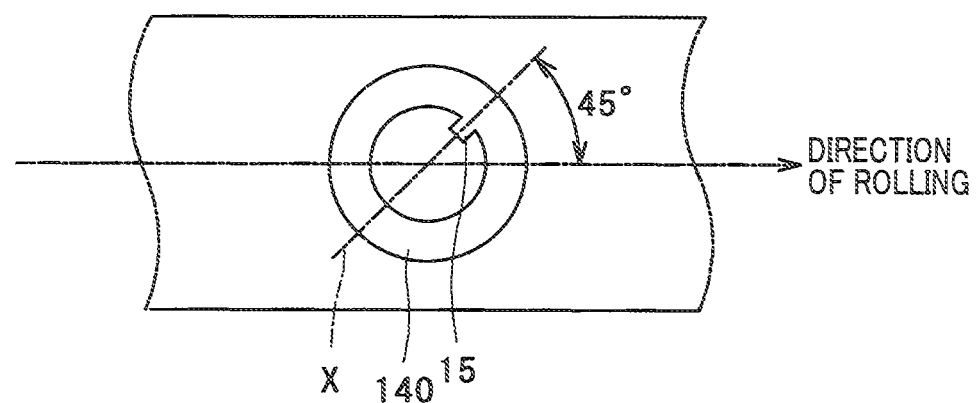
FIG. 3B is a schematic top view illustrating the process of pressing the rolled magnetic steel sheet to from the magnetic steels sheets that make up the steel sheet blocks.

As shown in FIGS. 3A and 3B, in the present embodiment, each of the magnetic steel sheets 140 is formed by punching a rolled magnetic steel sheet into a predetermined shape in a pressing step; the rolled magnetic steel sheet is formed by passing a magnetic steel material between pairs of rollers in a rolling step. Further, in the pressing step, a punch and a die are arranged so that in the resultant magnetic steel sheet 140, the angle between the imaginary line X and the direction of rolling of the magnetic steel sheet 140 is equal to 45°.

Referring back to FIGS. 1 and 2A-2B, in the present embodiment, each of the steel sheet blocks 14 has a plurality of pairs of slots 18 formed in the vicinity of the radially outer periphery of the steel sheet block 14. Each of the slots 18 extends in the axial direction of the steel sheet block 14 so as to penetrate the steel sheet block 14 in the axial direction. Each pair of the slots 18 is arranged so as to form a substantially V-shape that opens toward the radially outer periphery of the steel sheet block 14.

In each of the slots 18 of the steel sheet block 14, there is inserted and fixed a corresponding one of the permanent magnets 9. For each pair of the slots 18, the corresponding two permanent magnets 9, which are respectively inserted in the two slots 18 of the pair, together form a substantially V-shape that opens radially outward (i.e., toward the radially outer periphery of the steel sheet block 14). Moreover, the corresponding two permanent magnets 9 are arranged so that the polarities (north or south) of the corresponding two permanent magnets 9 are the same on the radially outer periphery of the steel sheet block 14. Consequently, the corresponding two permanent magnets 9 together form one magnetic pole 20 on the radially outer periphery of the steel sheet block 14. Further, all the magnetic poles 20 of the steel sheet block 14 are arranged in the circumferential direction of the steel sheet block 14 at predetermined intervals so that the polarities of the magnetic poles 20 alternate between north and south in the circumferential direction.

In addition, as shown in FIGS. 2A and 2B, for each of the magnetic poles 20, a centerline A of the magnetic pole 20 is circumferentially offset from both the imaginary lines X and Y. Here, the centerline A of the magnetic pole 20 is defined to extend straight, on the same plane as the imaginary lines X and Y, through the radial center of the steel sheet block 14 (or the center of rotation of the rotor core 8) so as to circumferentially bisect the magnetic pole 20. Further, all the magnetic poles 20 are asymmetrically arranged with respect to the imaginary line X.

In the present embodiment, the rotor core 8 is formed by stacking two steel sheet blocks 14 in the axial direction of the rotor core 8 with one of the steel sheet blocks 14 front-back inverted about the imaginary line X and thus being a mirror image of the other steel sheet block 14.

More specifically, each of the two steel sheet blocks 14 has a front surface as shown in FIG. 2A and a back surface as shown in FIG. 2B. It can be seen from FIGS. 2A and 2B that when each of the steel sheet blocks 14 is front-back inverted about the imaginary line X, the circumferential position of the key 15 remains unchanged while the direction of rolling and the circumferential positions of the magnetic poles 20 are changed.

In stacking the steel sheet blocks 14 to form the rotor core 8, as shown in FIG. 4, one of the steel sheet blocks 14 is mounted on the rotating shaft 11 by fitting the key 15 thereof into the keyway 16 of the rotating shaft 11 with the front surface thereof facing upward; this steel sheet block 14 will be referred to as forward steel sheet block 14A hereinafter. In comparison, the other steel sheet block 14 is first front-back inverted about the imaginary line X, and then mounted on the rotating shaft 11 by fitting the key 15 thereof into the keyway 16 of the rotating shaft 11 with the back surface thereof facing upward; this steel sheet block 14 will be referred to as backward steel sheet block 14B hereinafter.

Consequently, in the resultant rotor core 8, as shown in FIG. 2C, the circumferential position of the key 15 of the forward steel sheet block 14A is the same as that of the key 15 of the backward steel sheet block 14B. However, the direction of rolling of the forward steel sheet block 14A is circumferentially offset from that of the backward steel sheet block 14B by a mechanical angle of 90°. In addition, the circumferential positions of the magnetic poles 20 of the forward steel sheet block 14A are also circumferentially offset from those of the magnetic poles 20 of the backward steel sheet block 14B.

Furthermore, as described previously, each of the permanent magnets 9 is inserted in the corresponding one of the slots 18 of the steel sheet blocks 14. In the resultant rotor core 8, the circumferential positions of the permanent magnets 9 inserted in the slots 18 of the forward steel sheet block 14A are also circumferentially offset from those of the permanent magnets 9 inserted in the slots 18 of the backward steel sheet block 14B. Further, as shown in FIG. 1, each of the permanent magnets 9 inserted in the slots 18 of the forward steel sheet block 14A is out of axial alignment with an adjacent one of the permanent magnets 9 inserted in the slots 18 of the backward steel sheet block 14B. That is to say, the rotor 3 according to the present embodiment has a skewed structure in which the magnetic poles 20 of the rotor 3 are skewed.

In addition, in the present embodiment, as shown in FIGS. 2A and 2B, the number of the magnetic poles 20 of the rotor 3 is equal to 12. Moreover, the number of phases of the stator coil 5 is equal to 3. Accordingly, the number of slots (not shown) of the stator core 4, in which the stator coil 5 is received, is set to be equal to an integer multiple of 36 (i.e., n×12×3, where n is an integer).

According to the present embodiment, it is possible to achieve the following advantages.

In the present embodiment, the rotor 3 for the electric rotating machine 1 includes the rotor core 8 and the rotating shaft 11. The rotor core 8 is comprised of the substantially annular magnetic steel sheets 140 that are laminated in the axial direction of the rotor core 8. The rotating shaft 11 is configured to rotate together with the rotor core 8. Each of the magnetic steel sheets 140 includes the key 15 (i.e., a part of the key 15 of the corresponding steel sheet block 14) as the positioning portion for positioning the magnetic steel sheet 140 with respect to the rotating shaft 11 in the circumferential direction of the rotor core 8. Each of the magnetic steel sheets 140 is formed of the rolled magnetic steel sheet and thus has the direction of rolling thereof. For each of the magnetic steel sheets 140, the direction of rolling of the magnetic steel sheet 140 is circumferentially offset from both the imaginary lines X and Y. The imaginary line X extends straight, on a plane parallel to the magnetic steel sheet 140, through the center of rotation of the rotor core 8 so as to circumferentially bisect the key 15 of the magnetic steel sheet 140. The imaginary line Y extends straight, on the same plane as the imaginary line X, perpendicular to the imaginary line X. Each of the magnetic steel sheets 140 is shaped so that the circumferential position of the key 15 of the magnetic steel sheet 140 remains unchanged when the magnetic steel sheet 140 is front-back inverted about the imaginary line X. When viewed along the axial direction of the rotor core 8, the magnetic steel sheets 140 of the backward steel sheet block 14B are front-back inverted with respect to and thus being a mirror image of the magnetic steel sheets 140 of the forward steel sheet block 14A.

With the above configuration, all the keys 15 of the magnetic steel sheets 140 of the forward and backward steel sheet blocks 14A and 14B are located at the same circumferential position. Moreover, the direction of rolling of the magnetic steel sheets 140 of the forward steel sheet block 14A is circumferentially offset from that of the magnetic steel sheets 140 of the backward steel sheet block 14B. Consequently, when viewed along the axial direction of the rotor core 8, the direction of rolling of the magnetic steel sheets 140 of the forward steel sheet block 14A intersects that of the magnetic steel sheets 140 of the backward steel sheet block 14B. As a result, it becomes possible to reduce magnetic imbalance in the rotor core 8 without employing more than one type of the magnetic steel sheets 140 and without rotating the magnetic steel sheets 140 with respect to each other.

In the present embodiment, for each of the magnetic steel sheets 140 of the steel sheet blocks 14, both the angle between the direction of rolling of the magnetic steel sheet 140 and the imaginary line X and the angle between the direction of rolling of the magnetic steel sheet 140 and the imaginary line Y are equal to 45°.

With the above configuration, as shown in FIG. 2C, when viewed along the axial direction of the rotor core 8, the direction of rolling of the magnetic steel sheets 140 of the forward steel sheet block 14A intersects that of the magnetic steel sheets 140 of the backward steel sheet block 14B at 90°.

Consequently, it becomes possible to minimize magnetic imbalance in the rotor core 8 without employing more than one type of the magnetic steel sheets 140 and without rotating the magnetic steel sheets 140 with respect to each other.

In the present embodiment, for each of the magnetic steel sheets 140 of the steel sheet blocks 14, the key 15 of the magnetic steel sheet 140 is formed at a single position in the circumferential direction of the rotor core 8.

With the above configuration, it is possible to position all the magnetic steel sheets 140 of the steel sheet blocks 14 with respect to the rotating shaft 11 without forming more than one keyway 16 in the radially outer surface of the rotating shaft 11.

In the present embodiment, for each of the magnetic steel sheets 140 of the steel sheet blocks 14, the key 15 of the magnetic steel sheet 140 is in the radial protrusion-recess engagement with the rotating component 11. By the radial protrusion-recess engagement between the key 15 and the rotating shaft 11, the magnetic steel sheet 140 is circumferentially positioned and stopped from rotating with respect to the rotating shaft 11.

With the above configuration, it is possible to stop each of the magnetic steel sheets 140 of the steel sheet blocks 14 from rotating with respect to the rotating shaft 11 without employing any additional rotation-stopping means.

In the present embodiment, the rotor 3 has the magnetic poles 20 formed on the radially outer periphery of the rotor core 8. For each of the magnetic poles 20, the centerline A of the magnetic pole 20 is circumferentially offset from both the imaginary lines X and Y defined for the magnetic steel sheets 140. Further, all the magnetic poles 20 are asymmetrically arranged with respect to the imaginary line X.

With the above configuration, the circumferential positions of the magnetic poles 20 at the magnetic steel sheets 140 of the forward steel sheet block 14 are different from those at the magnetic steel sheets 140 of the backward steel sheet block 14. Consequently, it becomes possible to achieve the skewed rotor structure without employing more than one type of the magnetic steel sheets 140.

More specifically, in the present embodiment, the magnetic poles 20 of the rotor 3 are formed of the permanent magnets 9 embedded in the magnetic steel sheets 140 of the steel sheet blocks 14. The circumferential positions of the permanent magnets 9 embedded in the magnetic steel sheets 140 of the forward steel sheet block 14A are different from those of the permanent magnets 9 embedded in the magnetic steel sheets 140 of the backward steel sheet block 14B. Further, the permanent magnets 9 embedded in the magnetic steel sheets 140 of the forward steel sheet block 14A are out of axial alignment with those embedded in the magnetic steel sheets 140 of the backward steel sheet block 14B.

With the above configuration, it is possible to achieve the skewed structure of the permanent magnet-type rotor 3 without employing more than one type of the magnetic steel sheets 140.

In the present embodiment, each of the magnetic steel sheets 140 of the steel sheet blocks 14 is shaped by pressing the rolled magnetic steel sheet.

Consequently, in the resultant magnetic steel sheets 140, there remain burrs 22 on the respective end faces of the magnetic steel sheets 140 on the same side (e.g., on the respective front faces of the magnetic steel sheets 140) around the edges of the through-holes for inserting the rotating shaft 11 and the openings for forming the slots 18.

Figure 5:
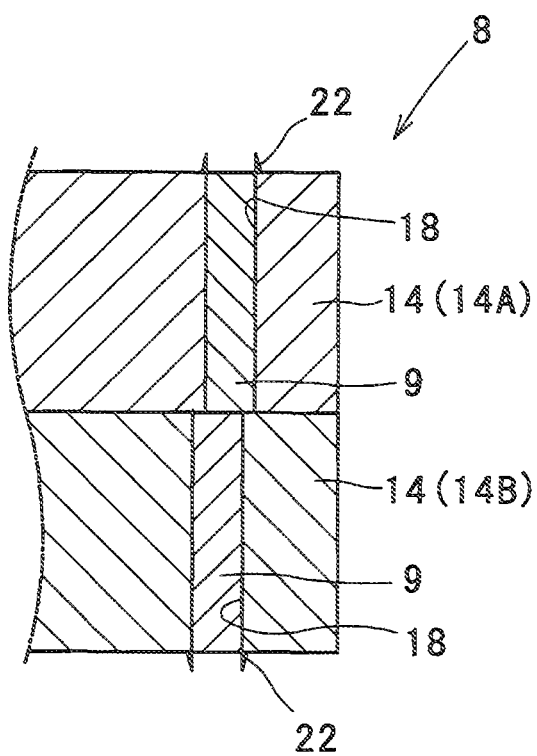
FIG. 5 is a schematic cross-sectional view of part of the rotor core.

Accordingly, as shown in FIG. 5, in the forward steel sheet block 14A, the burrs 22 of the magnetic steel sheets 140 are superposed to protrude toward one axial side of the rotor core 8 (i.e., protrude upward in FIG. 5); in the backward steel sheet block 14B, the burrs 22 of the magnetic steel sheets 140 are superposed to protrude toward the other axial side of the rotor core 8 (i.e., protrude downward in FIG. 5).

That is, in the present embodiment, by stacking the steel sheet blocks 14A and 14B with the backward steel sheet block 14B front-back inverted, it becomes possible to prevent the burrs 22 of the forward steel sheet block 14A from being axially superposed with those of the backward steel sheet block 14B. Moreover, it also becomes possible to make the circumferential positions of the burrs 22 of the forward steel sheet block 14A different from those of the burrs 22 of the backward steel sheet block 14B. Consequently, it becomes possible to reduce the axial length of the rotor core 8 and improve the degree of contact between the magnetic steel sheets 140 of the steel sheet blocks 14 without performing a deburring process. As a result, with the improved degree of contact between the magnetic steel sheets 140, it is possible to improve the rigidity of the rotor core 8 and reduce noise of the electric rotating machine 1 during operation.

In addition, when the rotor 3 is modified to be of a reluctance type and thus there are formed in the magnetic steel sheets 140 openings for forming magnetic flux barriers instead of the openings for forming the slots 18, it is still possible to achieve the above-described advantageous effects.

Furthermore, in the present embodiment, the rotor 3 is made by a method which includes a preparing step and a laminating/assembling step.

In the preparing step, the substantially annular magnetic steel sheets 140 and the rotating shaft 11 are prepared. More specifically, in this step, each of the magnetic steel sheets 140 is formed by punching the rolled magnetic steel sheet as described previously.

In the laminating/assembling step, the magnetic steel sheets 140 are first laminated to form the steel sheet blocks 14. Then, the steel sheet blocks 14 and the rotating shaft 11 are assembled together. Consequently, the steel sheet blocks 14 are stacked on the rotating shaft 11 with the magnetic steel sheets 140 of the backward steel sheet block 14B front-back inverted and thus being a mirror image of those of the forward steel sheet block 14A. Moreover, for each of the magnetic steel sheets 140 of the steel sheet blocks 14, the key 15 of the magnetic steel sheet 140 is fitted into the keyway 16 of the rotating shaft 11, thereby circumferentially positioning the magnetic steel sheet 140 with respect to the rotating shaft 11.

Second Embodiment

This embodiment illustrates a rotor 3 which has a similar configuration to the rotor 3 according to the first embodiment; accordingly, only the differences therebetween will be described hereinafter.

In the first embodiment, the electric rotating machine 1 is of an inner rotor type in which the rotor 3 is rotatably disposed radially inside of the stator 2 (see FIG. 1).

In comparison, in the present embodiment, the electric rotating machine 1 is of an outer rotor type in which the stator 2 is disposed radially inside of the hollow cylindrical rotor 3.

As shown in FIG. 6, in the present embodiment, the rotor 3 includes, instead of the rotating shaft 11 in the first embodiment, a hollow cylindrical rotating drum 25 that is disposed on the radially outer periphery of the rotor core 8 so as to rotate together with the rotor core 8.

More specifically, in the present embodiment, each of the steel sheet blocks 14 has, instead of the key 15 in the first embodiment, a keyway 26 as a positioning portion for circumferentially positioning the steel sheet block 14 with respect to the rotating drum 25. The keyway 26 is formed in the outer circumferential surface (or the radially outer surface) of the steel sheet block 14 so as to extend in the axial direction of the steel sheet block 14 (or the axial direction of the rotor core 8).

On the other hand, the rotating drum 25 has a key 27 that protrudes radially inward from the inner circumferential surface (or the radially inner surface) of the rotating drum 25 and extends in the axial direction of the rotating drum 25.

The key 27 of the rotating drum 25 is fitted into the keyways 26 of the steel sheet blocks 14, so that the steel sheet blocks 14 are circumferentially positioned and stopped from rotating with respect to the rotating drum 25.

In other words, in the present embodiment, the positioning portions (i.e., the keyways 26) of the steel sheet blocks 14 are in a radial protrusion-recess engagement with the rotating drum 25; with the radial protrusion-recess engagement, the steel sheet blocks 14 are circumferentially positioned and stopped from rotating with respect to the rotating drum 25.

Further, for each of the steel sheet blocks 14, the circumferential position of the keyway 26 of the steel sheet block 14 remains unchanged when the steel sheet block 14 is front-back inverted about an imaginary line X. Here, the imaginary line X is defined to extend straight, on a plane parallel to the steel sheet block 14, through the radial center of the steel sheet block 14 (or the center of rotation of the rotor core 8) so as to circumferentially bisect the keyway 26 of the steel sheet block 14.

Moreover, in the present embodiment, for each of the magnetic steel sheets 140 of the steel sheet blocks 14, the direction of rolling of the magnetic steel sheet 140 is circumferentially offset from both the imaginary line X and an imaginary line Y by a mechanical angle of 45°. Here, the imaginary line Y is defined to extend straight, on the same plane as the imaginary line X, perpendicular to the imaginary line X.

Furthermore, in the present embodiment, the rotor core 8 is formed by stacking two steel sheet blocks 14 in the axial direction of the rotor core 8 with one of the steel sheet blocks 14 (i.e., 14B in FIG. 6) front-back inverted about the imaginary line X and thus being a mirror image of the other steel sheet block 14 (i.e., 14A in FIG. 6).

The above-described rotor 3 according to the present embodiment has the same advantages as that according to the first embodiment.

Third Embodiment

This embodiment illustrates a rotor 3 which has a similar configuration to the rotor 3 according to the first embodiment; accordingly, only the differences therebetween will be described hereinafter.

In the first embodiment, the rotor core 8 is composed of the pair of steel sheet blocks 14 that are axially stacked with the backward steel sheet block 14B front-back inverted and thus being a mirror image of the forward steel sheet block 14A. Moreover, there is formed only the single keyway 16 in the radially outer surface of the rotating shaft 11.

In comparison, in the present embodiment, the rotor core 8 is composed of a first pair of steel sheet blocks 14A and 14B and a second pair of steel sheet blocks 14C and 14D.

As shown in FIGS. 7A and 7B, for the first pair of steel sheet blocks 14A and 14B, the steel sheet block 14B is front-back inverted about the imaginary line X and thus forms a mirror image of the steel sheet block 14A. Consequently, the circumferential position of the key 15 of the steel sheet block 14B is kept equal to that of the key 15 of the steel sheet block 14A. However, the direction of rolling of the steel sheet block 14B is circumferentially offset from that of the steel sheet block 14A by 90°.

As shown in FIGS. 7C and 7D, for the second pair of steel sheet blocks 14C and 14D, the steel sheet block 14D is front-back inverted about the imaginary line X and thus forms a minor image of the steel sheet block 14C. Consequently, the circumferential position of the key 15 of the steel sheet block 14D is kept equal to that of the key 15 of the steel sheet block 14C. However, the direction of rolling of the steel sheet block 14D is circumferentially offset from that of the steel sheet block 14C by 90°.

Further, referring to FIGS. 7A-7D, the second pair of steel sheet blocks 14C and 14D is rotated by a predetermined angle with respect to the first pair of steel sheet blocks 14A and 14B. Consequently, the circumferential position of the keys 15 of the steel sheet blocks 14C and 14D are offset from that of the keys 15 of the steel sheet blocks 14A and 15B by the predetermined angle.

On the other hand, as shown in FIG. 7E, the rotating shaft 11 has a pair of keyways 16 that are formed in the radially outer surface of the rotating shaft 11 so as to extend in the axial direction of the rotating shaft 11. Further, the keyways 16 are circumferentially offset from each other by the predetermined angle by which the keys 15 of the steel sheet blocks 14C and 14D are circumferentially offset from those of the steel sheet blocks 14A and 15B.

In assembling the rotor core 8 and the rotating shaft 11, both the keys 15 of the steel sheet blocks 14A and 14B are fitted into one of the keyways 16 of the rotating shaft 11, thereby circumferentially positioning the steel sheet blocks 14A and 14B with respect to the rotating shaft 11 and stopping relative rotation between the steel sheet blocks 14A and 14B and the rotating shaft 11. On the other hand, both the keys 15 of the steel sheet blocks 14C and 14D are fitted into the other keyway 16 of the rotating shaft 11, thereby circumferentially positioning the steel sheet blocks 14C and 14D with respect to the rotating shaft 11 and stopping relative rotation between the steel sheet blocks 14C and 14D and the rotating shaft 11. Consequently, the directions of rolling of the steel sheet blocks 14A-14D are circumferentially offset from one another. In other words, the directions of rolling of the steel sheet blocks 14A-14D do not coincide with each other.

With the above configuration of the rotor 3 according to the present embodiment, it is possible to more effectively reduce, without employing more than one type of the magnetic steel sheets 140, magnetic imbalance in the rotor core 8 in comparison with the rotor 3 according to the first embodiment.

While the above particular embodiments have been shown and described, it will be understood by those skilled in the art that various modifications, changes, and improvements may be made without departing from the spirit of the invention.

For example, in the previous embodiments, the electric rotating machine 1 is configured as a motor generator. However, the electric rotating machine 1 may also be configured as an electric generator or an electric motor.

In the previous embodiments, the rotor 3 is configured as an IPM rotor in which the permanent magnets 9 are respectively inserted in the slots 18 of the rotor core 8. However, the rotor 3 may also be configured as a Surface Permanent Magnet (SPM) rotor in which the permanent magnets 9 are provided on the radially outer surface of the rotor core 8.

Figure 8A:
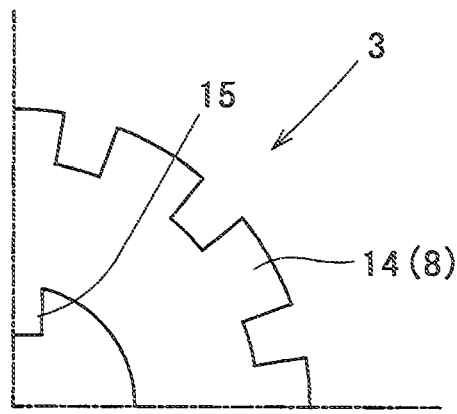
FIG. 8A is a schematic axial end view of part of a rotor core according to a first modification.
Figure 8B:
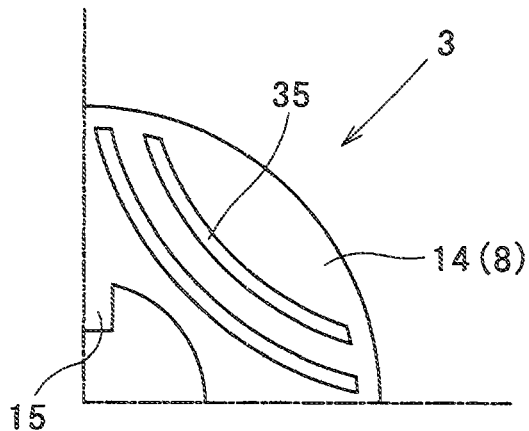
FIG. 8B is a schematic axial end view of part of a rotor core according to a second modification.

Moreover, as shown in FIG. 8A, the rotor 3 may also be configured as a reluctance-type rotor which has salient poles instead of the permanent magnets 9. Otherwise, as shown in FIG. 8B, the rotor 3 may also be configured as a flux barrier-type rotor in which flux barriers 35 are formed in the rotor core 8.

In the present embodiments, each of the steel sheet blocks 14 is made up of a plurality of the magnetic steel sheets 140 that are laminated in the axial direction. However, each of the steel sheet blocks 14 may also be made up of a single magnetic steel sheet that is formed of a rolled magnetic steel material and has a predetermined thickness.

In the previous embodiments, the steel sheet blocks 14 are circumferentially positioned with respect to the rotating shaft 11 or the rotating drum 25 via the key-keyway engagement.

However, the steel sheet blocks 14 may also be circumferentially positioned with respect to the rotating shaft 11 or the rotating drum 25 in other manners.

Figure 9:
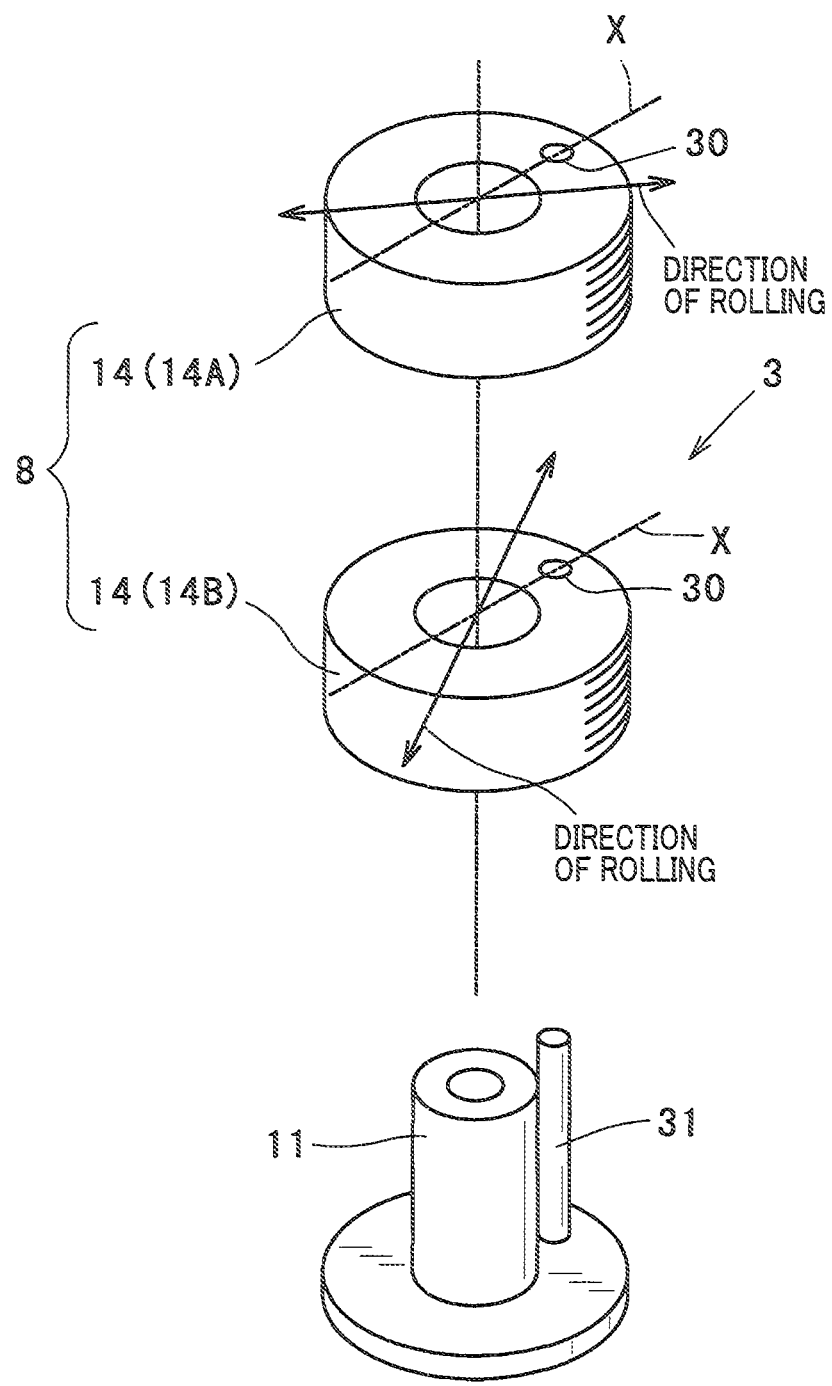
FIG. 9 is an exploded perspective view of a rotor according to a third modification.
Figure 10A:
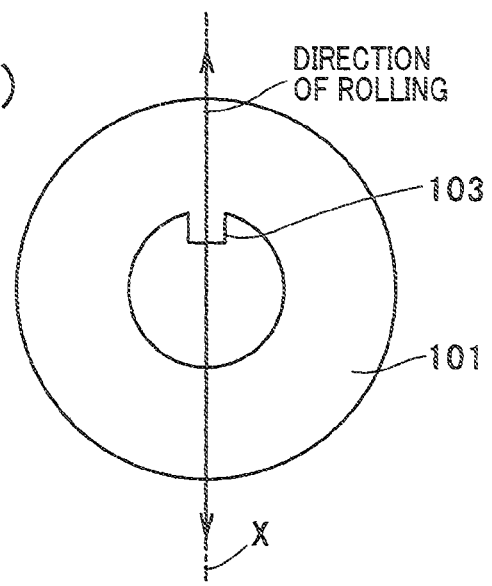
FIG. 10A is an axial end view of a steel sheet block for forming rotor core of a rotor according a related art.
Figure 10B:
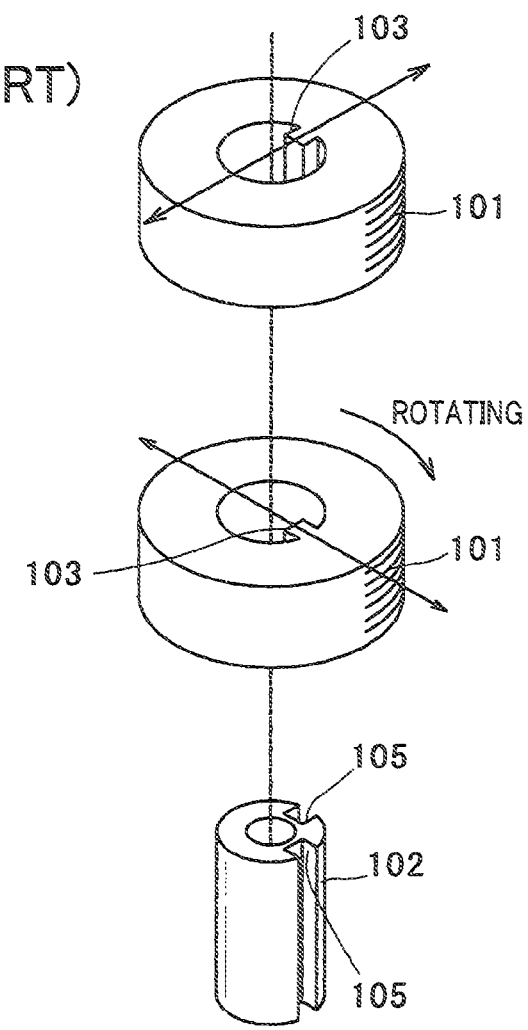
FIG. 10B is an exploded perspective view of the rotor according to the related art.

For example, as shown in FIG. 9, it is also possible to: (1) form a through-hole 30, as a positioning portion, in each of the steel sheet blocks 14 at a predetermined radial position so as to axially penetrate the steel sheet block 14; (2) form a pin 31 that is mechanically connected with the rotating shaft 11 and located at the same radial position as the through-holes 30 of the steel sheet blocks 14; and (3) fit the pin 31 into the through-holes 30, thereby circumferentially positioning the steel sheet blocks 14 with respect to the rotating shaft 11.

Alternatively, it is also possible to: (1) form a keyway, as a positioning portion, in each of the steel sheet blocks 14 so as to axially extend; (2) form a keyway in the rotating shaft 11 or the rotating drum 25 so as to radially align and communicate with the keyways of the steel sheet blocks 14; and (3) fit a pin into the internal space defined by the keyways of the steel sheet blocks 14 and the keyway of the rotating shaft 11 or the rotating drum 25, thereby circumferentially positioning the steel sheet blocks 14 with respect to the rotating shaft 11 or the rotating drum 25.

In the first embodiment, there is formed only the single key 15 in each of the steel sheet blocks 14 and only the single keyway 16 in the rotating shaft 11. However, it is also possible to form more than one key 15 in each of the steel sheet blocks 14 and more than one keyway 16 in the rotating shaft 11. For example, it is possible to form two keys 15 in each of the steel sheet blocks 14 so as to be circumferentially offset from each other by 180° and two keyways 16 in the rotating shaft 11 so as to be circumferentially offset from each other by 180°.

Similarly, in the second embodiment, there is formed only the single keyway 26 in each of the steel sheet blocks 14 and only the single key 27 in the rotating drum 25. However, it is also possible to form more than one keyway 26 in each of the steel sheet blocks 14 and more than one key 27 in the rotating drum 25. For example, it is possible to form two keyways 26 in each of the steel sheet blocks 14 so as to be circumferentially offset from each other by 180° and two keys 27 in the rotating drum 25 so as to be circumferentially offset from each other by 180°.

In the first and second embodiments, the rotor core 8 is formed by stacking the two steel sheet blocks 14 in the axial direction of the rotor core 8. However, the rotor core 8 may also be formed by stacking three or more steel sheet blocks 14 in the axial direction.

In the first and second embodiments, both the angle $\theta 1$ between the direction of rolling and the imaginary line X and the angle $\theta 2$ between the direction of rolling and the imaginary line Y are set to be equal to 45° (i.e., to be equal to each other). However, it is also possible to set the angles $\theta 1$ and $\theta 2$ different from each other provided that the sum of the angles $\theta 1$ and $\theta 2$ is equal to 90°.

What is claimed is:

1. A rotor for an electric rotating machine, comprising:
a rotor core comprised of a plurality of substantially annular steel sheets that are laminated in an axial direction of the rotor core; and
a rotating component configured to rotate together with the rotor core,
wherein
each of the steel sheets has a positioning portion for positioning the steel sheet with respect to the rotating component in a circumferential direction of the rotor core,
each of the steel sheets is formed of a rolled steel material and thus has a direction of rolling thereof,
for each of the steel sheets, the direction of rolling of the steel sheet is circumferentially offset from both an imaginary line X and an imaginary line Y by predetermined angles which are equal to 45°, the imaginary line X being defined to extend straight, on a plane parallel to the steel sheet, through a center of rotation of the rotor core so as to circumferentially bisect the positioning portion of the steel sheet, the imaginary line Y being defined to extend straight, on the same plane as the imaginary line X, perpendicular to the imaginary line X,
each of the steel sheets is shaped so that a circumferential position of the positioning portion of the steel sheet remains unchanged when the steel sheet is front-back inverted about the imaginary line X, and
when viewed along the axial direction of the rotor core, at least one of the steel sheets is front-back inverted with respect to and thus forms a mirror image of the other steel sheets.

2. The rotor as set forth in claim 1, wherein for each of the steel sheets, the positioning portion of the steel sheet is formed at a single position in the circumferential direction of the rotor core.

3. The rotor as set forth in claim 1, wherein for each of the steel sheets, the positioning portion of the steel sheet is in a radial protrusion-recess engagement with the rotating component, and
by the radial protrusion-recess engagement between the positioning portion and the rotating component, the steel sheet is circumferentially positioned and stopped from rotating with respect to the rotating component.

4. The rotor as set forth in claim 1, wherein the rotor has a plurality of magnetic poles formed on a periphery of the rotor core,
for each of the magnetic poles, a centerline A of the magnetic pole is circumferentially offset from both the imaginary lines X and Y defined for the steel sheets, the centerline A being defined to extend straight, on the same plane as the imaginary lines X and Y, so as to circumferentially bisect the magnetic pole, and
all the magnetic poles are asymmetrically arranged with respect to the imaginary line X.

5. The rotor as set forth in claim 4, wherein the magnetic poles of the rotor are formed of permanent magnets fixed to the rotor core,
the circumferential positions of the permanent magnets located at the at least one of the steel sheets are different from those located at the other steel sheets, and
the permanent magnets located at the at least one of the steel sheets are out of axial alignment with those located at the other steel sheets.

6. The rotor as set forth in claim 1, wherein each of the magnetic steel sheets is shaped by pressing the rolled steel material.

7. The rotor as set forth in claim 1, wherein the rotating component has a keyway, and the positioning portion of each of the steel sheets is configured to be fitted in the keyway.

8. A method of manufacturing a rotor for an electric rotating machine, the method comprising the steps of:
- preparing a plurality of substantially annular steel sheets and a rotating component, each of the steel sheets having a positioning portion for circumferentially positioning the steel sheet with respect to the rotating component;
- laminating the steel sheets to form a rotor core; and
- assembling the rotor core and the rotating component so that each of the steel sheets is circumferentially positioned with respect to the rotating component by the positioning portion thereof, wherein
- in the preparing step, each of the steel sheets is formed by punching a rolled steel material so that in the resultant steel sheet, a direction of rolling of the steel sheet is circumferentially offset from both an imaginary line X and an imaginary line Y by predetermined angles which are equal to 45°, the imaginary line X being defined to extend straight, on a plane parallel to the steel sheet, through a center of rotation of the rotor core so as to circumferentially bisect the positioning portion of the steel sheet, the imaginary line Y being defined to extend straight, on the same plane as the imaginary line X, perpendicular to the imaginary line Y, and
- in the laminating step, the steel sheets are laminated with at least one of the steel sheets front-back inverted with respect to and thus being a mirror image of the other steel sheets.

9. The method of claim 8, wherein for each of the steel sheets, the positioning portion of the steel sheet is formed at a common position in the circumferential direction of the rotor core.

* * * * *